US006046815A

United States Patent [19]

Johnson

[11] Patent Number: 6,046,815

[45] Date of Patent: Apr. 4, 2000

[54] RETRACTABLE PRINT MEDIUM TRAY FOR USE IN AN OPTICAL PRINTER

[75] Inventor: Bruce K. Johnson, North Andover, Mass.

[73] Assignee: Polaroid Corporation, Cambridge, Mass.

[21] Appl. No.: 08/931,351

[22] Filed: Sep. 16, 1997

[51] Int. Cl.[7] .............................. B41B 15/00; B41J 15/00; G06F 15/00

[52] U.S. Cl. ............................ 358/1.1; 358/296; 347/152; 347/222; 347/263

[58] Field of Search ................................ 358/296, 909.1, 358/1.1; 347/108, 152, 170, 222, 263; 396/535

[56] References Cited

U.S. PATENT DOCUMENTS

| | | | |
|---|---|---|---|
| 4,598,986 | 7/1986 | Shiratori et al. | 354/21 |
| 5,020,926 | 6/1991 | Wilhelm | 400/54 |
| 5,220,352 | 6/1993 | Yamamoto et al. | 346/76 |
| 5,633,670 | 5/1997 | Kwak | 347/188 |

FOREIGN PATENT DOCUMENTS

| | | |
|---|---|---|
| 0582033A2 | 2/1994 | European Pat. Off. . |
| 0582033A3 | 2/1994 | European Pat. Off. . |
| 9409588 | 4/1994 | WIPO . |
| 9639301 | 12/1996 | WIPO . |

*Primary Examiner*—Kimberly A. Williams
*Attorney, Agent, or Firm*—Barry Gaiman

[57] ABSTRACT

An optical printer is disclosed which detects photo speed, cartridge presence, pick location and door closure using only two sets of photo detectors. The disclosed optical printer uses a low-profile gear and switching mechanism which allows placement of the optical printer within a standard computer bay.

13 Claims, 4 Drawing Sheets

RETRACTABLE PRINT MEDIUM TRAY FOR USE IN AN OPTICAL PRINTER

BACKGROUND OF THE INVENTION

1. Field of the Invention

The present invention relates generally to means for providing a source of print medium to an optical printer and, more particularly, to an apparatus and method for the insertion of such media cartridges into the printer and their subsequent removal.

2. Description of the Prior Art

Optical printers produce output by exposing photosensitive media. The photosensitive medium is typically housed in a light-proof cartridge to protect against inadvertent exposure. For example, an instant photographic film, such as that described in commonly-assigned U.S. Pat. No. 4,226,519, "Self-developing film pack with improved spread control structure," issued to Gervais et al., is housed in a substantially rectangular cartridge. Photographic cameras that accommodate such cartridges often use a hinged door-like mechanism to provide for the insertion and removal of the cartridge from the photographic camera. With such mechanisms, clearance is provided at the hinge to allow for the swinging of the door. Such a configuration, however, becomes awkward when adapted to a photographic printer. The printer may be intended for use while sitting on a worksurface or in the bay of a personal computer, where the location does not provide adequate clearance for a hinged door. Moreover, if the printer is intended for placement into a computer bay, it needs to be relatively small in size. A design suitable for use in a photographic camera, for example, might comprise gear trains and switching systems that extend substantially above the film plane and would not, therefore, be suitable for use in a standard computer bay.

Removal of the cartridge from the camera may be accomplished by pulling outward upon a plastic tab or other protrusion extending from the cartridge. This configuration may be practical when the door is able to swing open freely and the camera can be oriented so as to facilitate removal of the cartridge. However, it is not convenient for an optical printer, even a stand-alone printer.

It is desirable for an optical printer to include the ability to determine the speed of the film, a reliable ejection mechanism for exposed media, and means to indicate whether a film cartridge has been loaded into the printer. In conventional optical printers, separate systems are utilized to provide such features. However, such additional systems incur increased manufacturing costs and increase the likelihood of operational failures.

Accordingly, it is an object of this invention to provide an optical printer that can be adapted to fit into a standard computer bay.

It is another object of this invention to provide an optical printer that accepts film cartridges while requiring minimal clearance at the hinged door.

It is still another object of this invention to provide an optical printer that has a low profile gear train and switching system.

It is a further another object of this invention to provide a substantially unitary film speed gauging device and reliable ejection mechanism.

SUMMARY OF THE INVENTION

The aforementioned and other objects are achieved by the invention which provides an optical printer having a photosensitive medium, such as an instant-type photographic medium, disposed within a cartridge.

The printer includes a housing with a tray, disposed in mechanical communication with the housing. The tray is substantially parallel to a housing axis and has both engaged and disengaged positions. In the disengaged position, the tray protrudes from the housing and facilitates insertion and removal of the cartridge. In the engaged position, the tray is positioned within the housing and thus places the medium into optical alignment with a print head. An external source provides imaging data to the printer whereby the print head exposes the medium.

The housing is preferably adapted for installation into the standard bay of a personal computer. The housing comprises a compact gear system to reduce the size and complexity of the printer. Photo interrupter devices are used to determine both the presence of the cartridge and the sensitivity, or "speed," of the medium in the cartridge.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which.

DESCRIPTION OF THE PREFERRED EMBODIMENTS

While the present invention retains utility within a wide variety of printing devices and may be embodied in several different forms, it is advantageously employed in connection with an optical printer. Additionally, the optical printer of the invention can be used with any of various types of films including, but not limited to, "instant-developing" film and conventional 35 mm film. However, the invention will be described with respect to instant-developing photographic film such as that manufactured by the Applicant. Although this is the form of the preferred embodiment and will be described as such, this embodiment should be considered as illustrative and not as restrictive.

Figure 1:
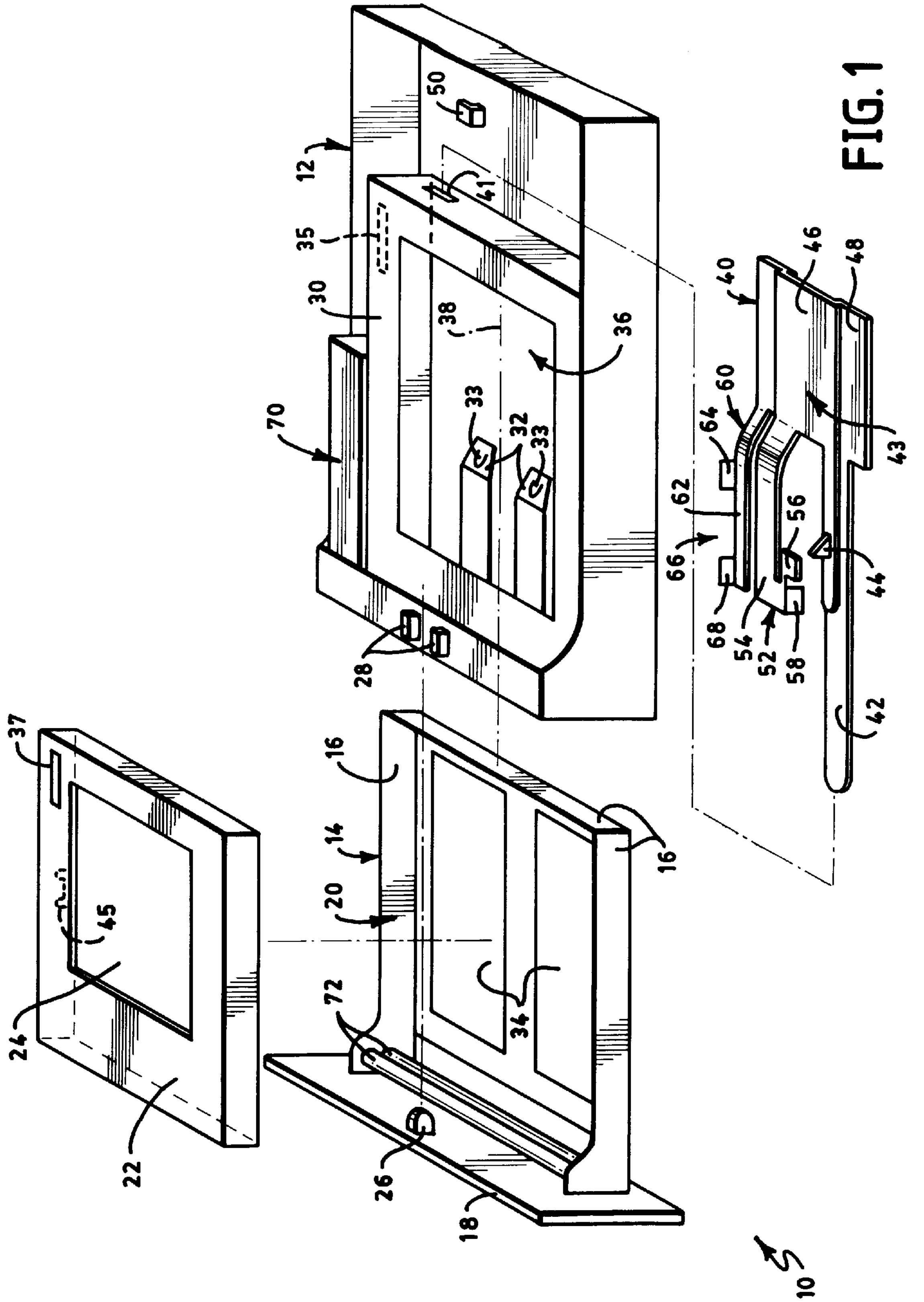
FIG. 1 is an exploded, perspective diagrammatical view of a printer in accordance with the present invention.

Referring now to FIG. 1, there is shown an optical printer 10 having a housing 12 adapted to fit into a standard computer bay. A standard computer bay has approximate internal dimensions of: 5.05" wide by 1.7" high by 8.5" deep, but one skilled in the art will realize that the printer of the invention can be adapted to other space requirements. A tray 14 is adapted for insertion into housing 12 such that when tray 14 is moved into an engaged position, tray 14 is substantially enclosed within a tray receptor 30. Tray 14 has lateral surfaces 16 and a face plate 18 which combine to form an enclosure for a cartridge receptor 20. Cartridge receptor 20 is substantially rectangular in shape for receiving a cartridge 22 of similar shape. It should be understood that cartridge receptor 20 is configured to accommodate the format of the medium being used as well as the shape of the medium cartridge.

Cartridge 22 contains a photosensitive medium 24, such as photographic film for example, which is placed into the film plane of the printer optical system. Medium 24 can be one of any of several types and from one of any of various manufacturers. Cartridge 22 fits securely within cartridge receptor 20 in tray 14 and tray 14 slides readily into tray receptor 30 in housing 12. When tray 14 is inserted within tray receptor 30 to define the engaged position, a tray latch tab 26 which is part of a rotatable door latch, passes into the opening of a closure photo interrupter 28, to indicate that the tray has been closed and is latched.

Tray latch tab 26 operates to interrupt a beam of light in tray closure photo interrupter 28. As is well known in the relevant art, photo interrupters operate by one side of the photo interrupter having a light source, such as a light emitting diode (LED), and the opposed side having a photo receptor, such as a photo diode, for example. When tray latch tab 26 drops into tray closure photo interrupter 28, the beam of light from the light source is no longer received by the photo receptor and thus tray closure photo interrupter 28 pass a signal to internal circuitry indicating the interruption. In this instance, the interruption is interpreted by the internal circuitry (not shown) as tray 14 having been fully inserted into tray receptor 30 and the latch engaged.

With tray 14 moved into the engaged position, springs 32 pass through spring openings 34 in tray 14. Springs 32 act to push cartridge 22 upwards into an exposure aperture 36, thus establishing a known distance from photosensitive medium 24 and a print head (not shown) in the printer which will ultimately image light onto photosensitive medium 24. Springs 32 will also catch a film cartridge that is placed upside down and prevent closure of the tray by inhibiting insertion of tray 14 into tray receptor 30. Springs 32 accomplish this by having a raised portion 33 that readily glides along a smooth surface, such as the bottom of a cartridge 22, but catches against non-uniform surfaces such as the top face of cartridge 22.

Exposure aperture 36 provides an opening into tray receptor 30 that substantially corresponds with an opening in cartridge 22 thereby leaving photosensitive medium 24 exposed. In this way the print head is then driven along a length of the exposure aperture to project light thereon. The projected light onto photosensitive medium 24 creates an image on photosensitive medium 24 that was dictated by the associated computer or other electronic image transfer system (not shown). Examples of such other electronic image transfer systems include cameras, camcorders, or scanners. When tray 14 is moved into the engaged position, tray 14 passes substantially along housing axis 38. Cartridge 22 then presses against a slide 40.

Figure 2:
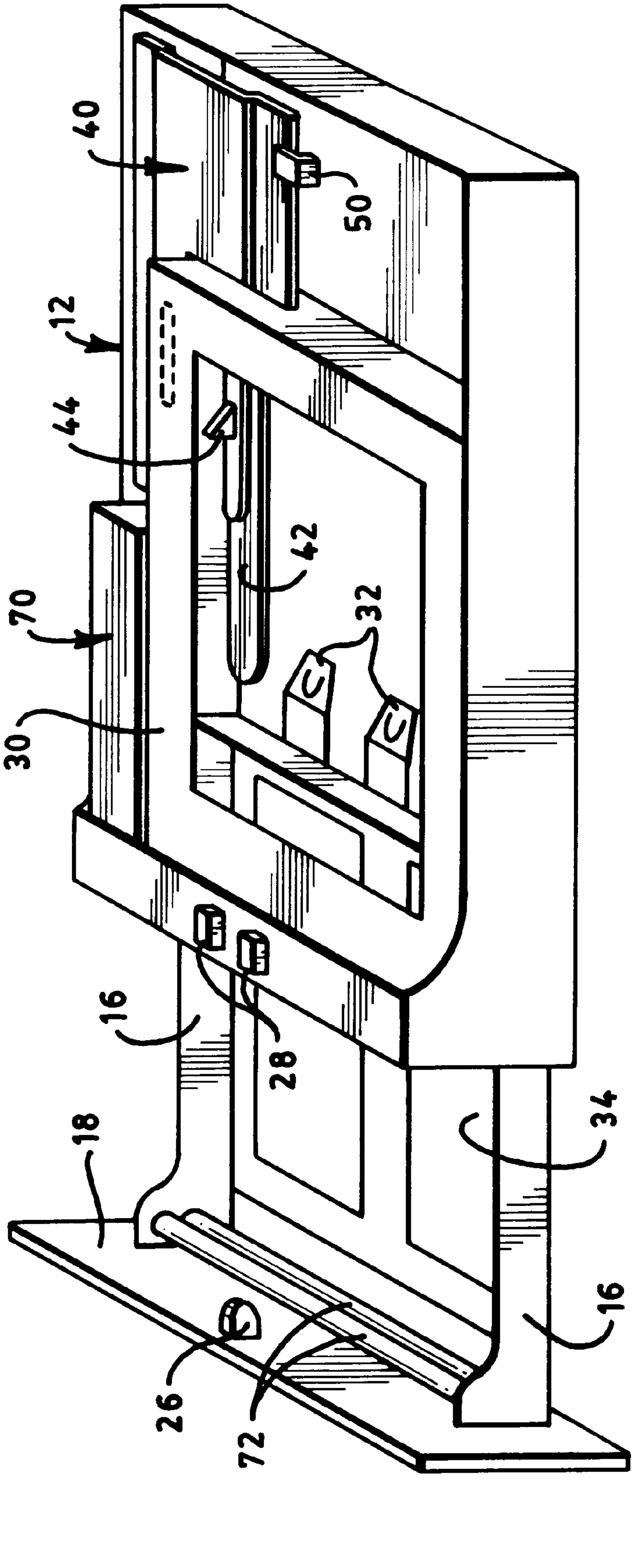
FIG. 2 illustrates the printer of FIG. 1 with a retractable medium tray in the disengaged position.

Referring now to FIGS. 1 and 2, slide 40 has a receptor extension 42 which passes through a receptor aperture 41 into tray receptor 30. Receptor extension 42 is substantially elongate from a base of slide 40. Extending substantially orthogonal to a plane of the receptor extension 42 is a stop 44, adapted to strike cartridge 22 if film speed tab 45 is missing. Presence of film speed tab 45 is determined by the speed of the film within cartridge 22. That is, at the point of manufacture when it is determined which speed photosensitive medium 24 will be used within cartridge 22, removal of film speed tab 45 is determined.

Once either receptor extension 42 hits the film speed tab 45 or stop 44 hits a base of cartridge 22, slide 40 is driven away from tray receptor 30. Slide 40 has a structure such that a protrusion in the base of housing 12 guides slide 40 by passing upwards into a guide 46. A lock extension 48 passes substantially outward from guide 46 and under a locking member 50 to secure slide 40 vertically to housing 12. Thus, as slide 40 is driven backwards away from the tray receptor 30, locking member 50 secures slide 40 vertically against housing 12.

Extending substantially outward at an angle with respect to base 43 is a pick indicator 52 having a pick interface arm 54. Pick interface arm 54 is substantially unitary with base 43 and is fabricated of a resilient material. Pick interface arm 54 terminates with a dark-slide tab 58 that extends vertically downward from the terminus of pick interface arm 54. Also extending outward from pick interface arm 54 is an actuator 56.

Pick indicator 52, as will be described in more detail later herein, indicates a position of pick 35. Pick 35, as is well known in the art, is used to urge photosensitive medium 24 out of cartridge 22 and into rollers 72. In the preferred embodiment, rollers 72 spread developer across photosensitive medium 24 such that the image exposed onto photosensitive medium 24 is developed and readily apparent to a viewer. Pick 35 operates by rotating downward and mechanically contacting photosensitive medium 24 through a spring arm (not shown). A timing gear drives pick 35 forward and pick 35 pushes photosensitive medium 24 through pick aperture 37 out of the cartridge and into spread rollers 72.

Pick interface indicator 52 is then indicative of when a new pack has been inserted by blocking photodetector 85 when the "dark slide" is being ejected. The dark slide in cartridge 22 system is a substantially opaque card that is disposed in cartridge 22 in front of photosensitive medium 24, thereby inhibiting premature exposure of photosensitive medium 24. Once the dark slide is ejected, photosensitive medium 24 is available for exposure.

When the dark slide, or the first piece of photosensitive media, within the cartridge is ejected directly after tray receptor 30 is closed, pick indicator 52 pops up and dark-slide tab 58 ceases to block photodetector 85 which is now covered by pick actuator 56. When pick 35 returns to the start position, photodetector 85 is fully unblocked and the transport cycle is terminated. Pick 35 is now ready to drive a piece of film from cartridge 22 and pick interface indicator 52 no longer plays a role.

Also extending outward from base 43 is a speed indicator 60 having a speed arm 62. Speed arm 62 extends outwardly at an angle from base 43 in much the same way as was previously described. However, speed arm 62 extends vertically upward a distance less than that of pick indicator 52. Speed arm 62 has a speed tab 68 and a load tab 64 extending vertically upward from speed arm 62. Speed tab 68 and load tab 64 are separated by an open aperture 66.

In practice, when tray 14 is loaded with a cartridge 22 and tray 14 is loaded into the engaged position within housing 12, stop 44 is contacted which pushes slide 40 outward toward a back portion of housing 12. Speed tab 68, aperture 66, and load tab 68 then are selectively moved between system photo interrupter 84. Depending upon which of speed tab 68, aperture 66, or load tab 64 are moved in front of system photo interrupters 84, circuitry related to system photo interrupters 84 indicates to printer 10 that a cartridge 22 has been loaded and what the film speed photosensitive medium 24 in the cartridge 22 is.

Figure 3A:
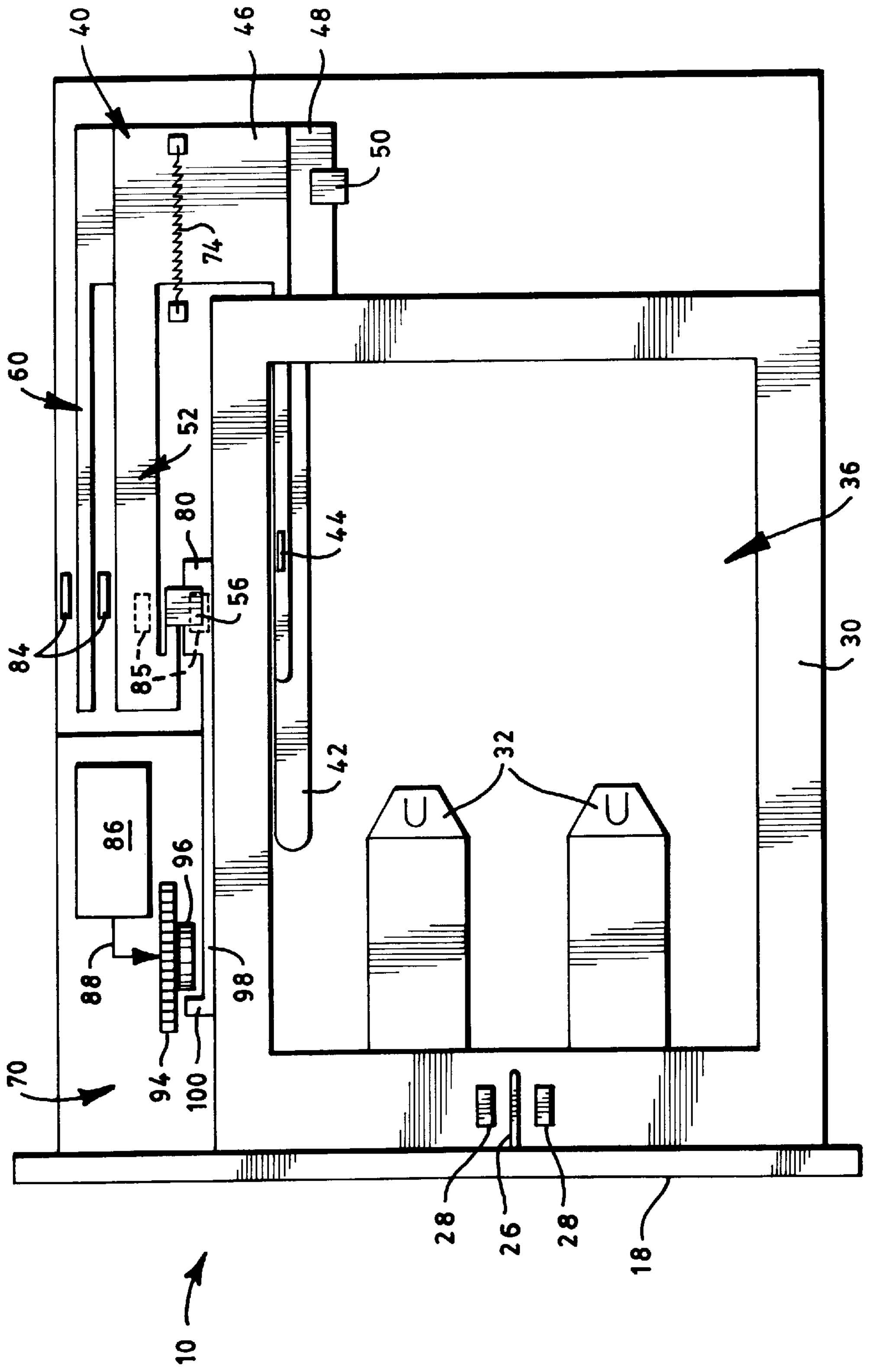
FIG. 3A is a plan diagrammatic view of the printer and tray of FIG. 1.
Figure 3B:
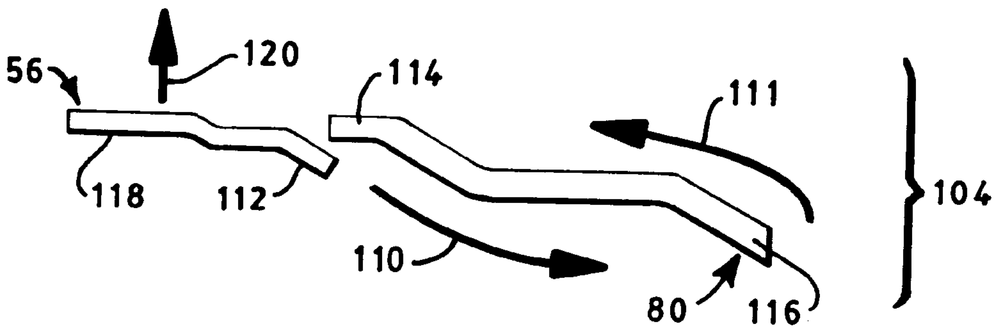
FIG. 3B is a cross-sectional view of the mechanical operation of an actuator and a pick guide.
Figure 3C:
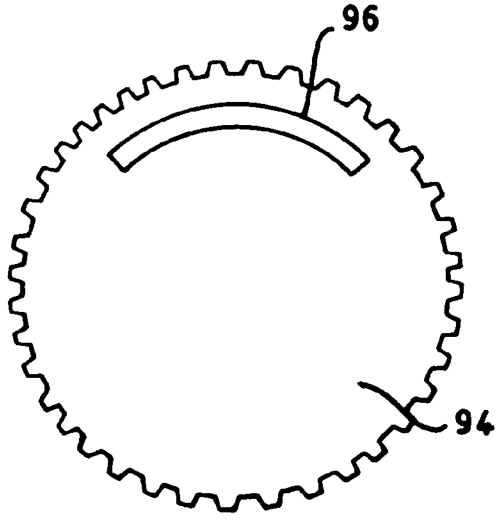
FIG. 3C shows a gear used in the gear train of the printer of FIG. 1.

The actual operation of the slide and the various extensions thereof are described in more detail in FIGS. 3A–3C.

It should be noted that with the tray in the engaged position, tray latch tab 26 passes between tray closure photo interrupters 28 indicating that the engaged position has been achieved. When film cartridge 22 is inserted within tray 14 and tray 14 is in the engaged position, stop 44 or tab 42 is driven backwards as previously described. Movement of stop 44, or tab 42 caused by the contact with cartridge 22 causes speed indicator 60 to be driven backwards. Thus, when there is no cartridge present slide 40 remains in its most forward position and speed tab 68 does not interrupt system photo pick interrupters 84. If no film cartridge 22 is present, the first cycle to print will electronically warn the user there is no film in the system.

If stop 44 is driven backwards a minimal amount then aperture 66 is placed between system photo interrupter 84. Thus, system photo interrupters 84 signal that the beam of light between system photo interrupters 84 is present thereby indicating that slow speed film is present. The circuitry associated therewith then uses slow settings of exposure that are stored for such slow speed film. If stop 44 is driven back further by normal film, speed tab 68 is moved into system photo interrupters 84.

For determining whether there is photosensitive media remaining within cartridge 22, printer 10 electronically counts and tracks the number of exposures remaining in cartridge 22 based upon a known starting position. For example, since in the preferred embodiment there are ten exposures in a cartridge, the printer assumes that each new cartridge inserted into printer 10 has ten exposures. Therefore, mechanical logic is included to "remember" if the tray has been opened and a new pack inserted. This occurs when dark-slide tab 58 blocks pick photo interrupter 84. That count is then decremented for each image printed. Since stand-alone printing systems can be powered down, the memory in which the count is stored is static.

Once photosensitive medium 24 has been exposed by the print head, photosensitive medium 24 must be driven out of optical printer 10 without exposing other photosensitive media remaining in cartridge 22. Thus, only one photosensitive medium 24 can be removed from cartridge 22 and ejected from printer 10. To do so, a motor 86 drives a mechanical system 88. Mechanical system 88 is illustrated generally as an arrow since it can be any of various systems well known in the art. Examples of such mechanical systems include gears, belts and pulleys, and gear and ratchets.

Regardless of the structure of mechanical system 88, gear 94 is driven by motor 86 to rotate. Mechanical system 88 is also in mechanical communication with pick 35 and spread rollers 72 to drive pick 35 and spread rollers 72 as previously described. Motor 86 therefore is both driving pick 35 and spread rollers 72. Thus, once pick 35 moves photosensitive medium 24 into spread rollers 72, pick 35 disengages from photosensitive medium 24 but spread rollers 72 roll across photosensitive medium 24 thus continuing to drive photosensitive medium 24 from optical printer 10.

As mechanical system 88 rotates gear 94, pick guide 80 is driven substantially linearly. This motion is translated by slide driver 96 which is shown with particularity in FIG. 3C. Slide driver 96 rotates and strikes a pick actuator 100 on the end of slide arm 98. As drive extension 96 rotates and moves slide arm 98, pick guide 80 is driven forward. Pick guide 80 then moves relative to actuator 56 which has an upward bias as is shown with particularity in FIG. 3B. Actuator 56 has a proximal section 112 extending downward relative to a distal section of pick guide 80. Thus, as actuator 56 is pushed back by insertion of photosensitive medium 24 and cartridge receptor tray 20 into tray receptor 30, it is forced downward under pick guide 80 substantially along first direction 110.

As pick actuator 100 is driven forward to process a dark-slide or first film 24. As the rotation of second gear 94 continues, actuator 56 is driven under a proximal end of pick guide 116 until a proximal end 118 of actuator 56 passes beyond proximal end 116 of pick guide 80. The upward bias 120 of actuator 56 then moves actuator 56 up substantially along second direction 111, causing load tab 58 to pop up from between system pick photo interrupters 85 allowing that interrupter to be unblocked by pick slide 80 at the end of its stroke. At this point, slide drive 96 has passed by slide tab 100 and actuator 56 is then being driven backwards on top of pick guide 80. Thus, load tab 68 is being driven away from system photo interrupters 85.

Once the tab (not shown) on pick guide 80 clears from the path of photointerrupter 85, optical printer 10 knows that pick 35 has returned to its initial positions. From this time, for every consecutive photosensitive medium 24 processed, photointerrupter 85 is controlled by pick guide 80 only to establish printer on/off condition. Once speed tab 64 reappears within system photo interrupters 84, optical printer 10 knows that pick 35 has returned to its initial starting position.

In summary, the printer uses a first set of photo interrupters 28 to sense wheterh tray 12 has been opened, and whether tray 12 has been closed with a new cartridge 22. If a cartridge is sensed, new exposures can commence after a dark slide that has been protecting the cartridge from exposure has been automatically ejected. If no new pack is sensed then exposure is inhibited.

Photo interrupters 84 and 85 perform dual functions. Photo interrupter 84 senses whether there has been emplaced a "normal" film or a "slow" film. Further, since film speed is thus detected, the appropriate exposure algorithm can be selected. Photo interrupter 84 also detects whether the system has a film pack or whether the system is "on." Additionally, photo interrupter 85 determine when pick 35 has returned to the end of an exposure cycle or a dark-slide cycle so that the processing monitor can be shut off. Photo interrupter 85 also determine if cartridge 22 has been removed and a new cartridge inserted.

The printer itself is compact in that the switches, processing motors and gears and electronics lay below a plane defined as slightly above the film plane. This is to provide room for the moving print head to transverse the film plane from a parked or protected "cleaning" position to the end of its travel. The print head needs to be relatively close to the film and is slightly wider than the film pack in order to provide space form molding and securing the optics and to provide sufficient border around the print head for manufacturability. Space is also provided for the slow-scan mechanism and guide rods which lie partially in the plane of the moving print head.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical printer using a print head to print an image onto a photosensitive medium disposed within a cartridge, said optical printer comprising:

a housing having a housing axis;

a tray disposed in mechanical communication with said housing, said tray having an engaged position and a disengaged position, said disengaged position being substantially external to said housing extending substantially parallel to the housing axis to facilitate insertion and removal of the cartridge, said engaged position being substantially internal to said housing such that the medium is positioned in optical alignment with the print head; and a pick which drives the photosensitive medium from the cartridge, wherein the position of said pick is determined optically.

2. The optical printer according to claim 1, wherein said housing is adapted to fit into the space of a computer bay.

3. The optical printer according to claim 1, wherein establishment of the engaged position is determined optically.

4. The optical printer according to claim 1, wherein presence of the cartridge in the tray is determined by an optical detector.

5. The optical printer according to claim 1, wherein exposure sensitivity of the medium is determined optically.

6. The optical printer according to claim 1, wherein presence of the cartridge is determined optically by a first optical interrupter.

7. The optical printer according to claim 6, further comprising a counter adapted to count a number of exposures remaining within a cartridge, said counter being in electrical communication with said first optical interrupter such that the counter is reset upon the presence of a cartridge and a transition from the engaged position to the disengaged position.

8. The optical printer according to claim 7, wherein the number of exposures remaining within a cartridge is stored in non-volatile memory.

9. The optical printer according to claim 1, wherein exposure speed of the medium is determined by an optical detector.

10. The optical printer according to claim 1 further comprising an elastic device adapted to lift cartridge toward the print head while preventing improper loading of the cartridge within the optical printer.

11. A loading system for use in a computer peripheral device which is adapted to print on photographic film the loading system comprising tray means selectively movable between and engaged position and a disengaged position, the disengaged position for accepting the photographic film and the engaged position for allowing the computer peripheral device to image onto the photographic film;

a pick which ejects exposed photographic film from the computer peripheral device; and second optical interruption means for determining a position of said pick means.

12. The loading system according to claim 11 further comprising rejection means for inhibiting the movement of said tray means from the disengaged position to the engaged position when the photographic film is loaded improperly.

13. The loading system according to claim 11 further comprising first optical interruption means for determining a presence of the photographic film and an exposure speed of the photographic film.

* * * * *